United States Patent
Brown et al.

(10) Patent No.: US 8,015,277 B2
(45) Date of Patent: Sep. 6, 2011

(54) METHOD AND SYSTEM FOR SIMULATING LATENCY BETWEEN LAYERS OF MULTI-TIER APPLICATIONS

(75) Inventors: Martin Brown, Hampshire (GB); Tim Peter Griffith, Hampshire (GB); David Evans Knibb, Yorkshire (GB); Ian Derek Heritage, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 12/372,936

(22) Filed: Feb. 18, 2009

(65) Prior Publication Data
US 2010/0211672 A1 Aug. 19, 2010

(51) Int. Cl.
*G06F 15/173* (2006.01)
(52) U.S. Cl. ........ 709/223; 709/203; 709/204; 709/219; 709/220; 709/222; 709/224; 709/238; 709/245
(58) Field of Classification Search .......... 709/203–204, 709/219–220, 222–224, 238, 245
See application file for complete search history.

(56) References Cited

U.S. PATENT DOCUMENTS

| | | | | |
|---|---|---|---|---|
| 5,958,010 | A * | 9/1999 | Agarwal et al. | 709/224 |
| 7,212,491 | B2 * | 5/2007 | Koga | 370/229 |
| 7,386,613 | B2 * | 6/2008 | Piccirilli et al. | 709/224 |
| 7,464,189 | B2 * | 12/2008 | Boyd et al. | 710/3 |
| 7,587,453 | B2 * | 9/2009 | Bhrara et al. | 709/204 |
| 7,676,594 | B2 * | 3/2010 | Fukasawa et al. | 709/238 |
| 7,680,834 | B1 * | 3/2010 | Sim-Tang | 707/999.201 |
| 7,698,457 | B2 * | 4/2010 | Ghetie et al. | 709/238 |
| 7,738,863 | B2 * | 6/2010 | Saarikivi et al. | 455/424 |
| 7,788,463 | B2 * | 8/2010 | Cooper | 711/203 |
| 2006/0193263 | A1 | 8/2006 | Vanamamalai et al. | |
| 2009/0150472 | A1 * | 6/2009 | Devarakonda et al. | 709/201 |

OTHER PUBLICATIONS

"How To: Simulate WAN Connections in Your Own Test Lab, for Free!" http://www.msterminalservices.org/articles/How-To-Simulate-WAN-Area-Connection-Test-Lab-Free.html website.
"The Flexlab Approach to Realistic Evaluation of Networked Systems", 4th USENIX Symposium on Networked Systems Design & Implementation; pp. 201-214 of the Proceedings, http://www.usenix.org/event/nsdi07/tech/full_papers/ricci/ricci_html website.
"Simulation or emultion—the model way to build and analyse your virtual network", Feb. 28, 2006, http://www.computerweekly.com/Articles/2006/02/28/214446/ website.

* cited by examiner

*Primary Examiner* — Yasin Barqadle
*Assistant Examiner* — Van Kim T Nguyen
(74) *Attorney, Agent, or Firm* — Scully, Scott, Murphy & Presser, P.C.; Joseph E. Bracken, Esq.

(57) ABSTRACT

A method, system and article of manufacture for simulating latency between software applications. There is provided a middleware component, e.g., a delay driver, within a multi-tier software product, the middleware component driver enables simulation of both latency and bandwidth restrictions experienced by the components in the multi-tier software product. The middleware component determines whether I/O request packets should be delayed, selects the number and types of I/O requests packets to be delayed and the amount of time to delay processing of the packets. Through the use of such a middleware component, a user is able to simulate various conditions experienced by the multi-tier software product.

19 Claims, 3 Drawing Sheets

METHOD AND SYSTEM FOR SIMULATING LATENCY BETWEEN LAYERS OF MULTI-TIER APPLICATIONS

FIELD OF THE INVENTION

This invention relates generally to geographically distributed computing environments, and more particularly, to the communication delays that occur in processing I/O packets across a large geographical distance.

BACKGROUND OF THE INVENTION

A primary goal for many businesses today is the delivery of increased availability of computing devices and their associated function, improved network services and dependable redundancy capabilities in the event of hardware and software failures. To address these goals, software that performs one or more business functions are frequently designed as multi-tier software products, and are often deployed in distributed locations. Multi-tier software products, as discussed herein, include software products that separate essential functionality, functionality crucial for reliable operation of the software product, into separate components, where these components are often operating discretely and often on different hardware. For example, voluminous data access and storage may be delegated to a Relational Database Management System (hereinafter, "RDMS"), which are often better equipped to handle complex data operations.

Figure 1:
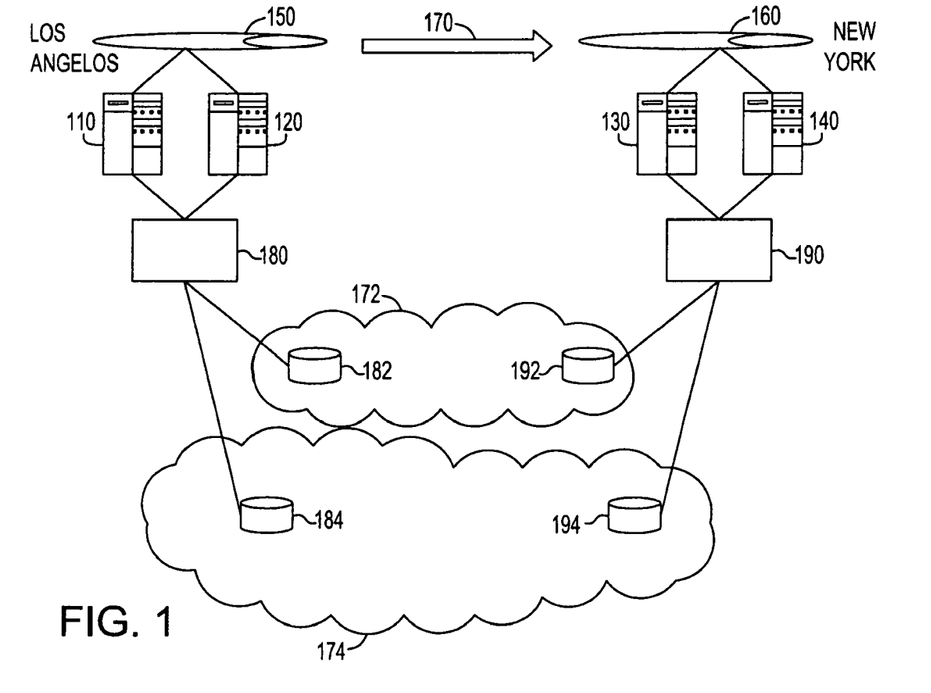
FIG. 1 illustrates an exemplary architecture of a geographically dispersed cluster server computing environment.

In addition, with the advent of fast networks and the global Internet, multi-tier software products are often deployed in distributed locations. For example, one solution that achieves the goals of increased availability, improved network services and dependable redundancy capabilities is a cluster of computing devices, or a "server cluster". FIG. 1 illustrates a geographically dispersed cluster arrangement, also known as geospan clusters or, more simply, geoclusters. Geoclusters may span a distance ranging from between a few hundred to few thousand kilometers. Each server in the cluster is termed a "node." A geographically dispersed cluster is a cluster that may have the following attributes: multiple storage arrays, at least one deployed at each site; nodes connected to storage in such a way that, in the event of a failure of a site or the communication links between sites, the nodes on a given site can access the storage on that site; and host-based software that provides a way to mirror or replicate data between the sites so that each site has a copy of the data.

In the example of FIG. 1, nodes 110 and 120 are located at first site and connected to each other via a network 150. Nodes 130 and 140 are located at a second site and are likewise locally connected via a network 160. The two sites are geographically dispersed. For example, the first site may be located in the Los Angeles area and the second in the New York area. The nodes and storage of the two sites are further coupled together by an appropriate network, schematically illustrated at reference numeral 170. Typically, the private and public network connections between cluster nodes must appear as a single, non-routed LAN. It is necessary when implementing geoclusters, therefore, to use virtual network technologies (e.g., VLANs) to ensure that all nodes in the cluster appear on the same IP subnets.

Continuing the example of FIG. 1, nodes 110 and 120 are connected to a storage controller array 180, and nodes 130 and 140 are connected to a second storage controller array 190. The storage arrays communicate with each other and present a single view of the disks spanning both arrays. Disks 182, 184, 192, and 194 are thus combined into a single logical device. Individual data stores, such as disks 182 and 192, are mirrored across the cluster, as indicated by cloud 172. Likewise, disks 184 and 194 are mirrored across the cluster, as indicated by cloud 174. The cluster may thus failover between any of the nodes 110, 120, 130 and 140, and any of the data stores 182, 184, 192, and 194. As a consequent of opaqueness in the geographic distribution of the computing devices in the cluster, the cluster illustrated in FIG. 1 is unaware of the geographic distance between its nodes, and is implemented at the network and storage levels within the infrastructure architecture.

To enforce the opaqueness of the geographic distribution of the computing devices and to facilitate communication between the different components of a multi-tier application with distributed resources (i.e., operating within a server cluster), a type of software technology described as "middleware" is frequently used to assist software architects and developers build multi-tier software products. Middleware is computer software often used to connect software components or applications residing on different physical machines. The software consists of a set of enabling services that allow multiple processes running on one or more machines to interact across a network. Middleware may include, but is not limited to, web servers, application servers, and similar tools that support application development and delivery. Middleware is especially integral to modem information technology based on, for example, XML, SOAP, Web services, and service-oriented architecture. The technology evolved to provide for interoperability in support of the move to coherent distributed architectures, which are used most often to support and simplify complex, distributed applications.

Consequently, middleware sits "in the middle" of a multi-tier software product and is between the different components of the software working on different operating systems. It is similar to the middle layer of a multi-tier single system architecture, except that it is stretched across multiple systems or applications. Examples include database systems, telecommunications software, transaction monitors, and messaging-and-queuing software.

Due to the geographic distribution of various computing devices within a cluster, propagation delay, even for signals travelling at the speed of light, can affect the stability of the cluster. Theoretically, a packet travelling at the speed of light in the most direct manner possible between two locations, e.g., Los Angeles and New York (approximately 4000 km) through a single dedicated fibre optic channel, will experience a 13.3 millisecond propagation delay in each direction and a roundtrip propagation of at least 26.6 milliseconds. This theoretical minimum, however, is unachievable due to the presence of multiple switches between such locations, each of which introduces substantial additional delay. In practice, however, typically latencies range from between 4 milliseconds for a 100 kilometers separation to 150 milliseconds for a 3700 kilometers separation in a geocluster implementation.

It is therefore necessary for developers of multi-tier software products, often residing on a server cluster, to insure that the latency of various operations, including input/output ("I/O") storage operations, is within the bounds required to support applications. In other words, it is necessary to be able to verify that the time to accomplish a certain operation between geographically distant servers, when added to the communication time to propagate a response, do not exceed a given latency threshold, such as 500 milliseconds.

It is further necessary for those who implement multi-tier software products to test a server cluster in a single location before physically deploying the software product, potentially across vast geographical distances. By testing the configuration in a single location prior to dispersing the nodes across different locations, the multi-tier software product team may be able to more efficiently identify and resolve system problems than if such problems were first identified in different (and physically distant) locations. This is because the expertise and resources to identify and resolve such problems can be concentrated in a single location. Once the configuration has been proven to work in a single location, the components of the multi-tier software product may then be separated.

The scenario illustrated in FIG. 1, however, inevitably leads to some degree of latency on network traffic between the two locations, and the amount of latency will affect the performance of the software products. There may also be constraints on the available bandwidth between the different locations, which could affect performance. Few testing departments (and the associated testing personnel) are able to maintain this kind of distributed environment. Instead, they may often conduct their testing on a single, local machine. This can make it difficult to determine how the products will perform with the amount of latency seen by customers.

SUMMARY OF THE INVENTION

In response to the deficiencies described above, herein are disclosed a method, system and article of manufacture that implements a new middleware component, e.g., a delay driver, within a multi-tier software product. The middleware component enables simulation of both latency and bandwidth restrictions experienced by the different components in the multi-tier software product. The middleware component determines, statically or dynamically, whether I/O request packets should be delayed, selects the number and types of I/O requests packets to be delayed and the amount of time to delay processing of the packets. Through the use of such a middleware component, a user (e.g., software testing personnel) is able to simulate various conditions experienced by the multi-tier software product. Through simulation, as afforded by the embodiments of the present invention described below, the user is benefited by being able to identify different possible issues that may occur in different environments, without having to physically reproduce those environments, such as software errors or bottlenecks in performance.

Therefore, one aspect of the present invention provides a computer-implemented method of transparently modifying network packet communications of a middleware component within a distributed software product executing on a processing device, comprising:

intercepting network communications of the middleware component, where the network communications are at least one of transmitted to and transmitted from the middleware component;

accessing a modification value and a modification type to determine the modification value and the modification type to perform on the network communications;

modifying the network communications according to the modification value and according to the modification type as modified network communications;

outputting the modified network communications.

Another aspect of the present invention provides a computer-readable storage device, readable by a computing device, which is tangibly embodying a program of instructions executable by the computing device to perform a method of transparently modifying network communications of a middleware component within a distributed software product executing on a processing device, comprising:

intercepting network communications of the middleware component, where the network communications are at least one of transmitted to and transmitted from the middleware component;

accessing a modification value and a modification type to determine the modification value and the modification type to perform on the network communications;

modifying the network communications according to the modification value and according to the modification type as modified network communications;

outputting the modified network communications.

Yet another aspect of the present invention provides a system of transparently modifying network communications of a middleware component within a distributed software product executing on a processing device, comprising:

means, implemented on a computing device, for intercepting network communications of the middleware component, where the network communications are at least one of transmitted to and transmitted from the middleware component;

means, implemented on a computing device, for accessing a modification value and a modification type to determine the modification value and the modification type to perform on the network communications;

means, implemented on a computing device, for modifying the network communications according to the modification value and according to the modification type as modified network communications;

means, implemented on a computing device, for outputting the modified network communications.

Further benefits and advantages of the invention will become apparent from a consideration of the following detailed description, given with reference to the accompanying drawing, which specifies and shows preferred embodiments of the invention.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings. In each of the drawings below, as well as the respective descriptions, the same numbers are used throughout to reference like components and/or features.

DETAILED DESCRIPTION

One embodiment of the present application invention uses techniques from Aspect Oriented Programming (hereinafter "AOP") to inject a controlled amount of latency into a system, and to control the available bandwidth. As a programming paradigm, AOP seeks to increase a software project's modularity by allowing the separation of cross-cutting concerns (see generally, Kiczales et al. "Aspect-Oriented Programming", Proceedings of the European Conference on Object-Oriented Programming, vol. 1241, pp. 220-242 (1997), incorporated herein by reference). One common implementation of AOP is Aspect-J (see generally, Meersman et al. "On the Move to Meaningful Internet Systems 2003: CoopIS, DOA, and ODBASE: OTM Confederated International Conferences CoopIS, DOA, and ODBASE 2003", Springer, pp. 1245-1246 (2003)). As commonly defined, cross-cutting concerns are aspects of a program which affect, or crosscuts, other concerns (id.). These concerns often cannot be cleanly decomposed from the rest of the system, from both a design and implementation perspective, and result in either scattering or tangling of the program, or both.

AOP solves this problem by allowing the programmer to express cross-cutting concerns in stand-alone modules called aspects. Aspects can contain advice (executable code joined to specified points in the program) and inter-type declarations (structural members added to other classes). Within the main body of the code, the programmer defines a set of join-points—where the set of join points is also known as a point-cut. For example, a security module in a multi-tier bank application can include advice that performs a security check before accessing a bank account. Thus, in a sample bank application, the point-cut for the security module identifies the portions in the application (e.g., the specific join-points) that a bank account can be accessed. The code associated with the join-points (the advice body) defines how the security check is implemented. That way, both the security check and the places in the software to perform the security check can be maintained in one place. Further, a good point-cut can anticipate later program changes, so if another developer creates a new method to access the bank account, the advice will apply to the new method when it executes.

While an embodiment of the present invention that utilizes AOP will be described in detail below, it understood by those skilled in the relevant art that AOP is one paradigm, among many, that could be used to achieved the same results (see e.g., Lieberherr et al., *Adaptive Object-Oriented Programming Using Graph-Based Customization*, Communications of the ACM, 37(5), p. 94-101 (1994)) and should not be view as a limitation on the present application.

In one embodiment of the present invention, injecting a controlled amount of latency and controlling the available bandwidth to the system is achieved by intercepting calls to the middleware layer used to connect the various components of a complex software project. For example, as described in further detail below, AOP may be used to intercept requests to a middleware layer situated between two software layers. When the first software layer is an application and the second software layer is a database, the middleware layer is commonly referred to as to a database connection driver (see e.g., Open DataBase Connectivity, or simply "ODBC" and Java DataBase Connection, or simply "JDBC"). Although the descriptions below describe a two-layer model, the description is for illustrative purposes only and is not a limitation on the present invention. Those skilled in the art could, without undue experimentation, adapt what is described as a middleware layer situated between two software layers to three or more layers, where the middleware components are situated between every pair of layers.

Figure 2:
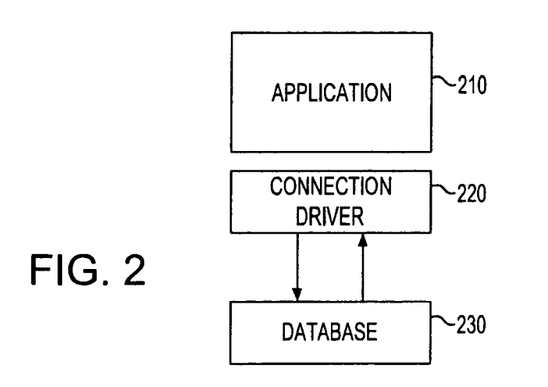
FIG. 2 illustrates a two-tier application system, involving an application and a database running on computers in different geographic locations.

FIG. 2 illustrates this concept of a middleware layer situated between two software layers. In FIG. 2, Application 210 is the first software layer, Database 230 is the second software layer and situated therebetween is connection driver 220, or the middleware layer. The structure shown in FIG. 2 may also be described simply as a two-tier application system. In addition, the structure illustrated in FIG. 2 may involve an application and a database running on two computing devices (e.g., servers in a cluster) residing in different geographic locations, but not necessarily. The servers are logically connected, via a network or other means, to allow communication between the servers.

The middleware component, connection driver 220, is a lightweight software component which handles inbound requests to the database. All data sent to or retrieved from the database are passed though this middleware component. Thus, according to one embodiment of the present application, an AOP aspect is defined to intercept calls to within connection driver 220 and insert additional processing. In addition, according to one embodiment of the present invention that utilizes AOP, the advice code corresponding to the aspect defined is executed at specific points (e.g., join points, as discussed above) in the multi-tier program's execution to simulate various network effects. The network effects (e.g., latency, limited bandwidth, etc) could be applied to any network protocol. Examples of such protocols include, but are not limited to, TCP, UDP, RTP, RTCP and other packet based network protocols know to those skilled in the art. In addition, any one of the following types of advice can be used when implementing this aspect: around advice, before advice after advice, etc. For example, around advice is preferred because around advice executes the code before and after the join point and would consequently allow latency and/or bandwidth restrictions to be simulated in both directions while using a single piece of advice. Before and after advice (e.g., advice code executed before or after the join point, respectively), however could also be used when separation of incoming and/or outgoing simulation is desired.

Figure 3:
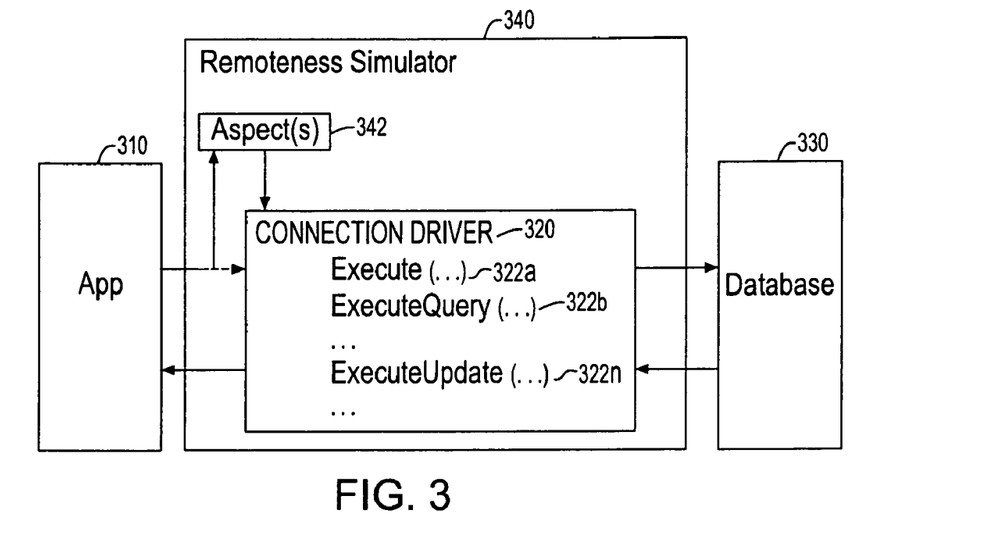
FIG. 3 illustrates a conceptual view of the Remoteness Simulator, according to one embodiment of the present invention.

FIG. 3 is a schematic diagram of a two-tier application system according to one embodiment of the present invention. As with FIG. 2, App 310 is logically connected to Database 330 to allow communication thereto. Connection driver 320 is situated between App 310 and Database 330, and exposes a set of commands (e.g., Execute( ) 322a, ExecuteQuery( ) 322b and ExecuteUpdate( ) 322n) to App 310 such that when App 310 requests information from Database 330, the request passes through Connection Driver 320 first before being sent to Database 330. Wrapped around Connection Driver 320 is an addition software component, the Remoteness Simulator 340 that implements one or more Aspect(s) 342. In one embodiment of the present invention, the Aspect(s) 342 interact with the Connection Driver 320 in such a way that Aspect(s) 342 simulate different network effects on the function calls of Connection Driver 320. As illustrated in FIG. 3, Remoteness Simulator 340 is a software wrapper that transparently modifies the network packet communications of the middleware component (e.g., Connection Driver 320) and uses one or more aspects to apply different network effects before and after the execution of methods within Connection Driver 320.

Figure 4:
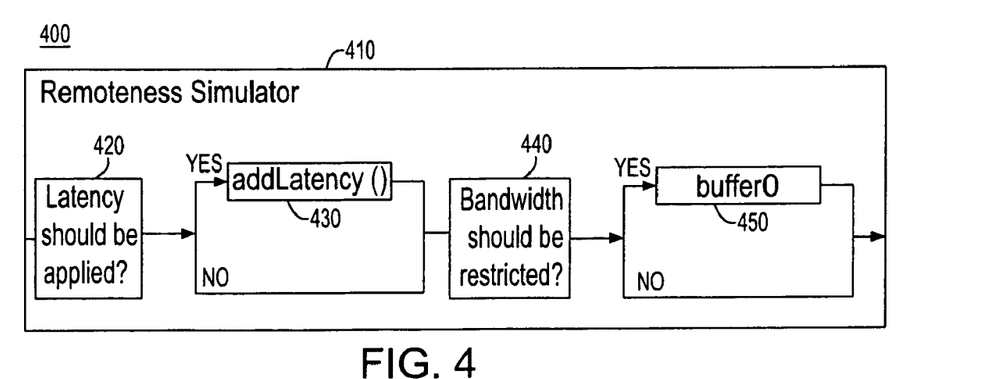
FIG. 4 illustrates the process applied by the remoteness simulator, according to one embodiment of the present invention.

Illustrated in FIG. 4 are the computer-implemented steps executed by one aspect in the Remoteness Simulator 410, which is a part of middleware component 400. The steps illustrated in the aspect of Remoteness Simulator 410 shown in FIG. 4 are preferably applied in an around advice; namely, the steps would be applied both before and after the execution of those methods within a connection driver (e.g., Connection Driver 320) that communicates with a database (e.g., Database 330). If the steps shown in FIG. 4 are not taken before and after execution of methods in a connection driver (hence, the aspect of FIG. 4 may be applied as a before or after advice), Remoteness Simulator 410 would be effective in only one direction. In addition, different aspects of the Remoteness Simulator 410 may operate on different types of I/O, not just packet-based network communications. Although the discussion that proceeds is focused on the one aspect and the application thereof to a single type of I/O (namely, packet-based network communications), those skilled in the art could, without undue experimentation, adapt the discussion below to other types of I/O (e.g., disk I/O, memory I/O, etc.) and additional aspects.

As illustrated in FIG. 4, Remoteness Simulator 410 determines whether to apply a latency to the incoming data at step 420 (i.e., simulate network latency). If Remoteness Simulator 410 determines to apply latency (either statically or dynamically, as described below), Remoteness Simulator 410 proceeds to addLatency 430; otherwise Remoteness Simulator 410 bypasses addLatency 430 and proceeds directly to step 440. According to one exemplary embodiment, addLatency 430 is implemented by calling a pre-defined sleep( ) method with an argument (e.g., a modification value) used to pause execution of a middleware component (e.g., Connection Driver 320 in FIG. 3) for a specified period of time. The amount of time may be described according to the number of processing cycles in a computing device or temporal time (e.g., milliseconds or other fractions of a second). Typically, the sleep method is defined by a standard library in the programming language used to implement the present invention. Alternatively, the sleep( ) method could be made available from within the operating system or within the underlying hardware. Those skilled in the art would recognize, however, that other embodiments are possible and the present invention is not intended to be limited in any way to the above exemplary embodiment.

At step 440, Remoteness Simulator 410 determines whether bandwidth should be restricted (e.g., to simulate limited bandwidth). If Remoteness Simulator 410 determines bandwidth should be restricted (either statically or dynamically, as described below), Remoteness Simulator 410 proceeds to buffer 450; otherwise Remoteness Simulator 410 is finished and cleanly exits its execution cycle. To simulate limited bandwidth, one embodiment of the present invention requires that all transmitted data packets be written to a buffer, e.g., a fixed length array data structure programmed to accept any type of data (commonly referred to as a "byte array"), and read from that array in First In First Out (FIFO) order. Thus, when the byte array is full, Remoteness Simulator 410 will stop accepting new data to be processed until the byte array has available space for additional data. Although not illustrated in FIG. 4, buffer 450 simulates limited bandwidth in this manner. Since the byte array is of fixed size, and the speeds at which reads and writes are performed is assumed to be constant, the size of the array can be used to simulate available bandwidth. To constrain bandwidth, the size of the buffer must be smaller than the amount of data being transmitted. Since in most applications data transmission occurs via a packet based network protocol (e.g., IP TCP, UDP, etc), the size of the buffer may simply be the size of a data packet times the number of data packets to retain in the buffer. For non-packet based network protocols (e.g., SS7) the size of the buffer may translate to an amount of time on the communication channel times the speed of the communication channel. Consequently, to estimate a specific loss of bandwidth, a buffer of a size related to the speed of the computing device is used. A more general, and simplified, use of the buffer, however, merely keeps the amount of available bandwidth as proportional to the buffer size. Thus, to simulate greater bandwidth, a larger buffer would be needed, and vice versa.

According to one embodiment of the present invention, determination of whether to apply latency and/or a bandwidth restriction is predetermined, and hence a static parameter is accessed during the execution of the method shown in FIG. 4 to control the amount of latency and/or bandwidth limitation to apply. In another embodiment of the present invention, the determination of whether to apply the operations illustrated in FIG. 4 are modifiable during runtime and hence are dynamically controlled. For example, while not shown in FIGS. 3 and 4, the simulation parameters to both the network latency and the limited bandwidth actions may receive a control signal which specifies the degree of latency and/or bandwidth restriction. According to one exemplary embodiment, a control signal could communicate a shared memory address and, by reading the shared memory referenced by the shared memory address, the degree of latency and/or bandwidth restriction could be obtained. The shared memory could be made available, for example, by a user (via a user interface component) or user process. Thus, by giving a multi-tier software product testing personnel control over the degree of the simulation during the runtime, the testing personnel are able to alter the operating parameters of the complex software project quickly and efficiently.

Figure 5:
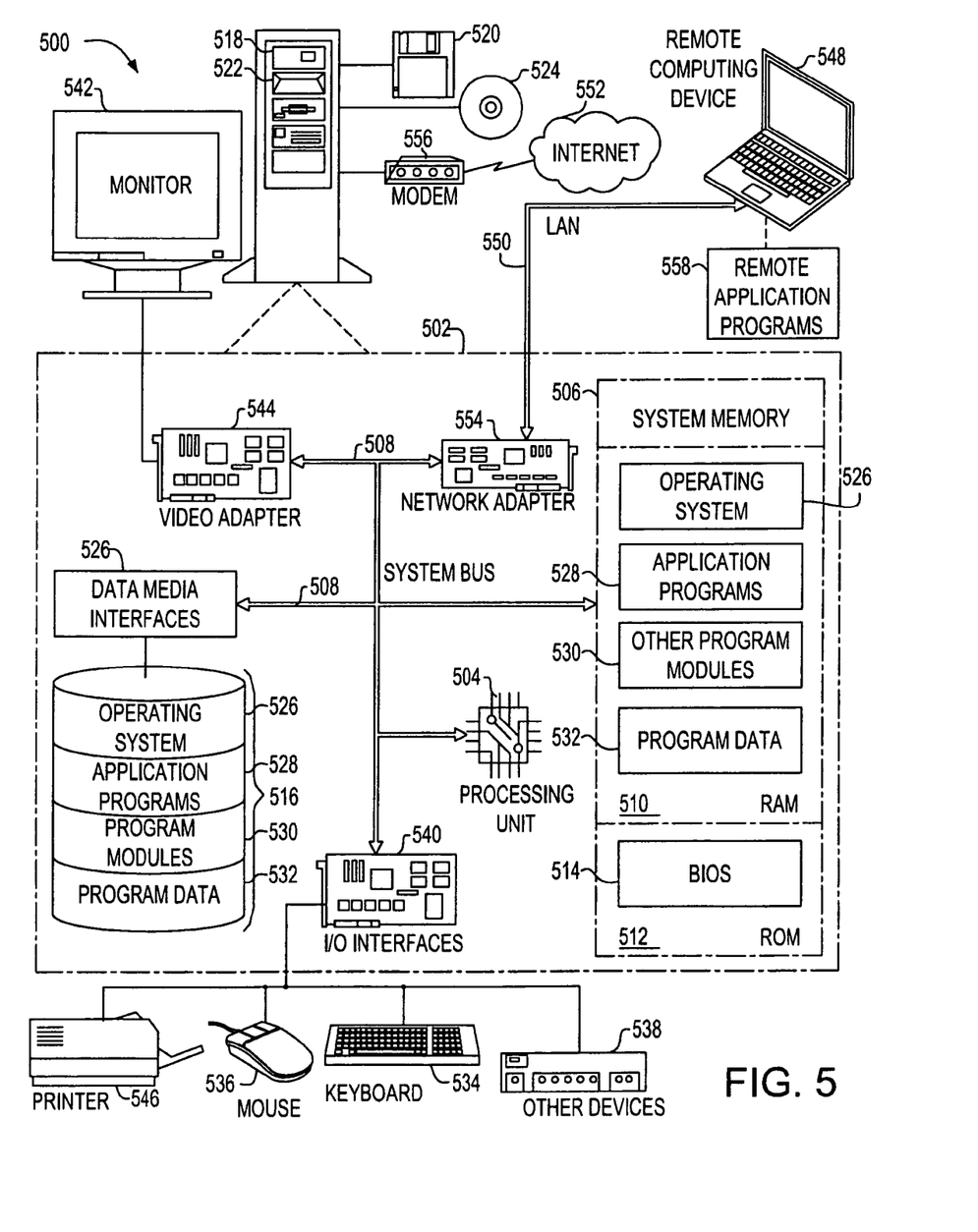
FIG. 5 illustrates a general computing environment that, as an example, may be used to practice this invention.

FIG. 5 illustrates a general computer environment 500 that can be used to implement the simulator for simulating latency and bandwidth constraints in a complex software project, as described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Both the LAN and WAN form logical connections via wired communication mediums and appropriate communication protocols (such as Ethernet, see e.g., IEEE 802.3-1998 Std) or wireless communication mediums and appropriate communications protocols (such as WiFi, see e.g., IEEE 802.11-2007 Std). Such networking environments are commonplace in homes, offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfil the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer-implemented method of simulating network packet communications between layers of software applications, said software applications communicating via a driver component within a distributed software product executing on a processing device, comprising:
    intercepting function calls communicated to or from said driver component, said function calls requesting data I/O operations between said software applications layers;
    accessing, at said driver component, one or more user-specified parameters for simulating latency and bandwidth effects of network communications, said one or more parameters specifying one or more of: a latency modification value and bandwidth modification value and a respective latency and bandwidth modification type to perform on the network communications; and, one or more of:
        calling, responsive to a latency modification type at said processing device, a sleep function for simulating a communications latency effect of I/O communications between said applications according to a latency modification value; and,
        passing, responsive to a bandwidth modification type at said processing device, said I/O data communicated between said software applications, through a buffer for modifying a data transfer rate of said I/O data communicated according to a bandwidth modification value,
    wherein users dynamically control simulated network effects of a distributed software product.

2. The method according to claim 1, wherein when the modification type is latency, the modification value is equal to an applied latency to the network communications.

3. The method according to claim 1, wherein when the modification type is bandwidth, the modification value is an amount of available bandwidth.

4. The method according to claim 3, where the modification value is an upper size limit to said buffer.

5. The method according to claim 4, wherein the upper size limit is measured in physical storage space occupied by the buffer.

6. The method according to claim 4, wherein the upper size limit is measured in number of entries permitted in the buffer.

7. The method according to claim 1, wherein said driver component is a connection driver to a database.

8. The method according to claim 1, wherein the distributed software product is a two-tier application.

9. The method according to claim 1, further including providing a simulation wrapper around said driver component, said intercepting function calls being performed by a programmed Aspect operating in said wrapper.

10. A computer program product for simulating network packet communications between layers of software applications, said software applications communicating via a driver component within a distributed software product executing on a processing device, the computer program product comprising a non-transitory storage medium readable by a processor and storing instructions run by the processor for performing a method, the method comprising:
    intercepting function calls communicated to or from said driver component, said function calls requesting data I/O operations between said software applications layers;
    accessing, at said driver component, one or more user-specified parameters for simulating latency and bandwidth effects of network communications, said one or more parameters specifying one or more of: a latency and bandwidth modification value and a respective latency and bandwidth modification type to perform on the network communications; and, one or more of:
        calling, responsive to a latency modification type at said processing device, a sleep function for simulating a communications latency effect of I/O communications between said applications according to a latency modification value; and,
        passing, responsive to a bandwidth modification type at said processing device, said I/O data communicated between said software applications, through a buffer for modifying a data transfer rate of said I/O data communicated according to a bandwidth modification value,
    wherein users dynamically control simulated network effects of a distributed software product.

11. The computer program product according to claim 10, wherein when the modification type is latency, the modification value is equal to an applied latency to the network communications.

12. The computer program product according to claim 10, wherein when the modification type is bandwidth, the modification value is an amount of available bandwidth.

13. The computer program product according to claim 10, wherein said driver component is a connection driver to a database.

14. The computer program product according to claim 10, further including providing a simulation wrapper around said driver component, said intercepting function calls being performed by a programmed Aspect operating in said wrapper.

15. A system for simulating network packet communications between layers of software applications, said software applications communicating via a driver component within a distributed software product executing on a processing device, said system comprising:
- a memory;
- a processor in communication with said memory, said processor configured to perform a method comprising:
    - function calls communicated to or from said driver component, said function calls requesting data I/O operations between said software applications layers;
    - accessing, at said driver component, one or more user-specified parameters for simulating latency and bandwidth effects of network communications, said one or more parameters specifying one or more of: a latency modification value, a bandwidth modification value and a respective latency and bandwidth modification type to perform on the network communications; and, one or more of:
    - calling, responsive to a latency modification type at said processing device, a sleep function for simulating a communications latency effect of I/O communications between said applications according to a latency modification value; and,
    - passing, responsive to a bandwidth modification type at said processing device, said I/O data communicated between said software applications, through a buffer for modifying a data transfer rate of said I/O data communicated according to a bandwidth modification value,
    - wherein users dynamically control simulated network effects of a distributed software product.

16. The system according to claim 15, wherein when the modification type is latency, the modification value is equal to an applied latency to the network communications.

17. The system according to claim 16, wherein when the modification type is bandwidth, the modification value is an amount of available bandwidth.

18. The system according to claim 17, where said modification value is an upper size limit to said buffer.

19. The system according to claim 1, further including: a simulation wrapper around said driver component, said wrapper operating a programmed Aspect for intercepting said function calls.

* * * * *